US011580007B2

(12) United States Patent
Volckaert et al.

(10) Patent No.: US 11,580,007 B2
(45) Date of Patent: Feb. 14, 2023

(54) SELF-DEBUGGING

(71) Applicant: NAGRAVISION SA, Cheseaux-sur-Lausanne (CH)

(72) Inventors: Stijn Volckaert, Ghent (BE); Bjorn De Sutter, Ghent (BE); Bert Abrath, Ghent (BE)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 729 days.

(21) Appl. No.: 16/466,044

(22) PCT Filed: Dec. 5, 2017

(86) PCT No.: PCT/EP2017/081587
§ 371 (c)(1),
(2) Date: Jun. 3, 2019

(87) PCT Pub. No.: WO2018/104344
PCT Pub. Date: Jun. 14, 2018

(65) Prior Publication Data
US 2019/0286551 A1    Sep. 19, 2019

(30) Foreign Application Priority Data
Dec. 5, 2016 (EP) .................... 16202259

(51) Int. Cl.
*G06F 11/36* (2006.01)
*G06F 21/52* (2013.01)
*G06F 21/54* (2013.01)
(52) U.S. Cl.
CPC ........ *G06F 11/3644* (2013.01); *G06F 11/362* (2013.01); *G06F 11/3624* (2013.01);
(Continued)

(58) Field of Classification Search
CPC ............... G06F 11/362; G06F 11/3624; G06F 11/3628; G06F 11/3644; G06F 11/3664;
(Continued)

(56) References Cited

U.S. PATENT DOCUMENTS 7,647,589 B1    1/2010 Dobrovolskiy et al.
9,262,300 B1 *  2/2016 Haba ..................... G06F 11/362
(Continued)

FOREIGN PATENT DOCUMENTS

FR      3 003 967 A1    10/2014
JP       2012-008825 A    1/2012
KR      1020100017844 A   2/2010

OTHER PUBLICATIONS

T. Yi et al., "Anti-debugging Framework Based on Hardware Virtualization Technology," 2009 International Conference on Research Challenges in Computer Science, 2009, pp. 218-220, doi: 10.1109/ICRCCS.2009.63. (Year: 2009).*
(Continued)

*Primary Examiner* — Hanh Thi-Minh Bui
(74) *Attorney, Agent, or Firm* — Hoyng Rokh Monegier B.V.; David P. Owen

(57) ABSTRACT

In overview, methods, computer programs products and devices for securing software are provided. In accordance with the disclosure, a method may comprise attaching a debugger process to a software process. During execution of the software process, operations relevant to the functionality of the code process are carried out within the debugger process. As a result, the debugger process cannot be replaced or subverted without impinging on the functionality of the software process. The software process can therefore be protected from inspection by modified or malicious debugging techniques.

9 Claims, 4 Drawing Sheets

(52) U.S. Cl.
CPC .............. *G06F 21/52* (2013.01); *G06F 21/54* (2013.01); *G06F 2221/033* (2013.01)

(58) Field of Classification Search
CPC ...... G06F 8/443; G06F 8/4434; G06F 8/4441; G06F 21/52; G06F 21/54; G06F 2221/033
See application file for complete search history.

(56) References Cited

U.S. PATENT DOCUMENTS

| | | | |
|---|---|---|---|
| 2009/0217235 A1* | 8/2009 | Suenbuel | G06F 11/366 717/124 |
| 2014/0289707 A1* | 9/2014 | Guan | G06F 11/3624 717/124 |
| 2017/0109257 A1* | 4/2017 | Li | G06F 8/70 |

OTHER PUBLICATIONS

Horejsi, "Analysis of a self-debugging Sirefef cryptor", May 29, 2013, XP002767119, URL: https://blog.avast.com/2013/05/29/analysis-of-a-self-debugging-sirefef-cryptor.

* cited by examiner

SELF-DEBUGGING

The work leading to this disclosure has received funding from the [European Union] [European Atomic Energy Community] Seventh Framework Programme ([FP7/2007-2013] [FP7/2007-2011]) under grant agreement n° 609734

FIELD

The present disclosure relates to software security, particularly to protection of software such as applications or libraries from attacks using debugging techniques.

BACKGROUND

Debugging is the process by which errors in code can be identified. One tool for this is the debugger, a type of utility which many operating systems allow to be paired with code to be debugged. When an exception or other error occurs, this is reported to the debugger which is able then to inspect the code and identify the origin of this problem.

The ability to pair a debugger with code has been utilised by malicious parties in order to compromise the security of that code. In particular, since a debugger is able to identify the operation of code, it can be a source of vulnerability.

Techniques have been developed to try to protect code against such attack. These techniques include attempts to allow code to identify when an active debugger has been illicitly coupled to the code. Another approach is to design the code to itself initiate a debugger when executed (this debugger can be termed a "self-debugger"). Most operating systems will only allow a single debugger to be paired with a given process, meaning the self-debugger occupies the space a malicious debugger may otherwise wish to use.

DETAILED DESCRIPTION OF THE DRAWINGS

Figure 1:
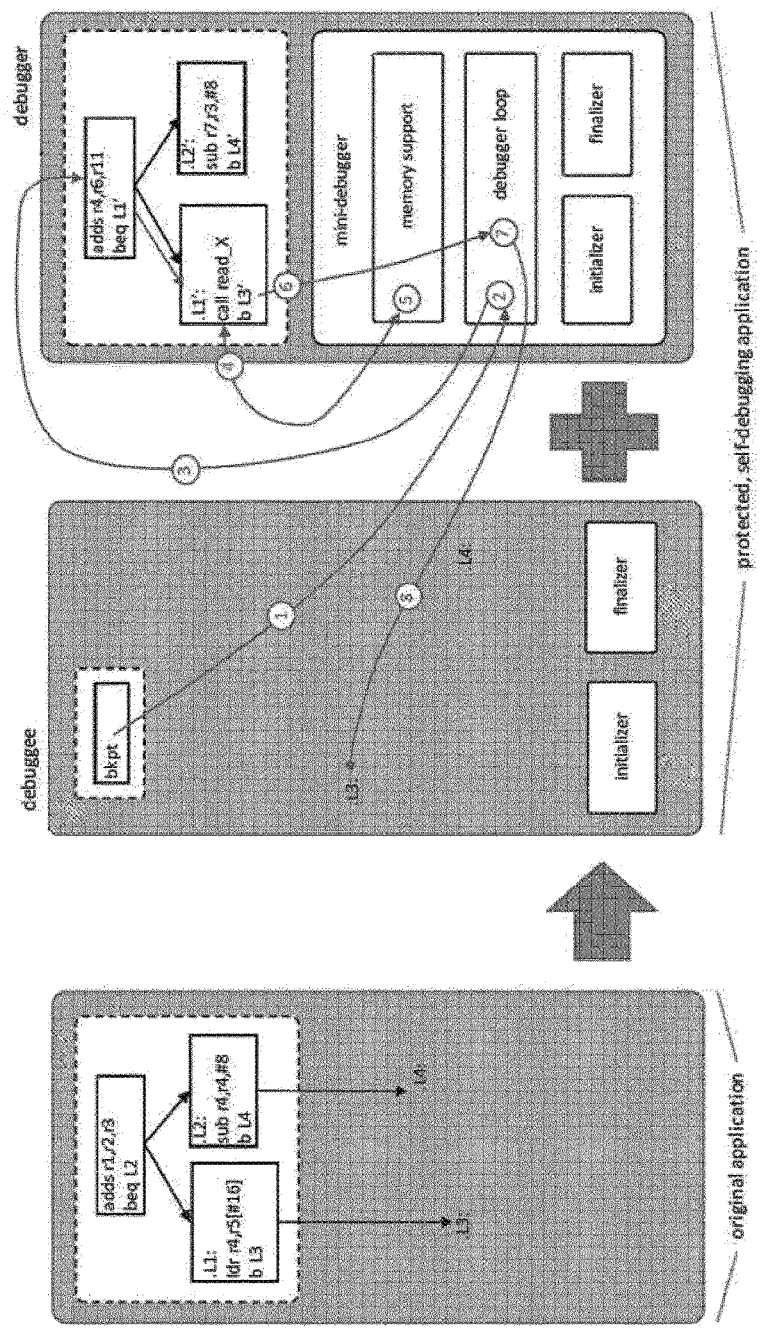
FIG. 1 is a schematic illustration of the main features of a prior at code process, and the couple code process and debugger process of the present disclosure.
Figure 2:
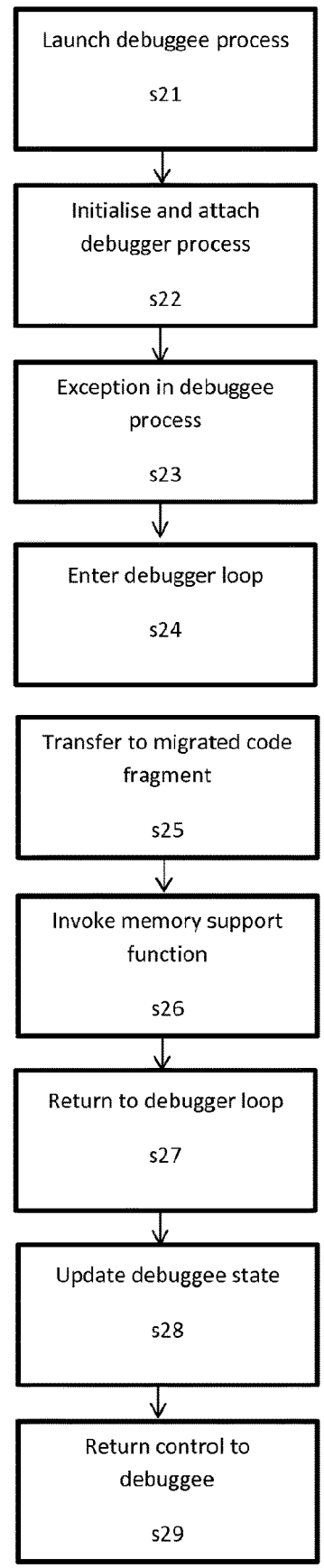
FIG. 2 is a flow chart showing runtime steps according to an embodiment.

In overview, methods for securing the operation of code are provided. In accordance with the disclosure, a method may comprise launching a code process and initialising a debugger process attached to the code process. During execution of the code process, operations critically relevant to the functionality of the code process can be carried out within the debugger process. As a result, the debugger process cannot be replaced or subverted without impinging on the functionality of the code process. The code process can therefore be protected from inspection by modified or malicious debugging techniques.

In this context, "critically" can be understood to mean that the output produced by those operations carried out in the debugger process serves as input for the remaining part of the code process, and that that input is necessary to allow the code process to generate its correct output given that code process' other input.

In some aspects of the disclosure a method for securing software is provided. The method may comprise launching a software process and attaching a debugger process to the software process. The code process can then be executed such that the debugger process is invoked at least once. Upon invocation, one or more functions may be performed within the debugger process, these functions having an output dependent on data associated with the software process. Since the output can vary in dependence on data associated with the software process (i.e. it is not predetermined), the overall functionality is only achieved when both software process and debugger process are operating correctly. This does not leave space for interference with the debugger process to analyse the code.

The software process of this aspect may be considered a "debuggee" process since it takes the place of the process being debugged by the debugger. The debugger process may be initialised when the software process is launched or at a later time. For example, a debugger process may be initialised when certain functionality (e.g. a library) is loaded into the software process). In some examples, the software process forks to initialise the debugger process. In other examples, the debugger process may be initialised first and then fork to generate the software process.

In some embodiments, the output comprises a data output for use by the software process. Thus the output of the functions within the debugger process can directly influence the later operation of the software process, thereby tightly coupling the two processes in a way which is not easy to break. The output of the function in the debugger process comprises a data input for the software process, said data input being critical for the execution of the software process.

In some embodiments, the output of a given function may indicate multiple points of return within the software process for continued execution. As such, the point of return for at least one function is variable (rather than fixed). The control flow is thus variable according to the behaviour of the debugger process and cannot be readily inferred or recreated.

In some embodiments, the debugger process the debugger process provides memory support capabilities to enable the one or more functions to retrieve data from memory within address space of the software process. As such, the program-relevant functions can have an ability to process data as if they were carried out within the software process.

The debugger process can be invoked when a break point within the code process is reached. The debugger process can be detached from the software process when the software process finishes. The software process may finish because it is complete, or otherwise (such as when aborted). Alternatively, the debugger process may be detached from the software process when functionality within the software process finishes rather than waiting for the process as a whole to finish.

In some embodiments, the software process implements an executable, such as an application. In others, the code process implements a library.

In another aspect of the disclosure, there is provided a method for generating protected code. Code fragments within object code to be migrated to a debugger can be identified. Binary code can then be generated, where the binary code at runtime causes a debugger process to attach to a software process, the identified code fragments being executed within the debugger process. The software process and the debugger process may be forked from a single process. For example, the software process may initialise the debugger process.

The step of generating may comprise incorporating predefined code corresponding to generic debugger functionality within the binary code. The generating step may be a linking step incorporating some predefined aspects of the debugger such aspects may be termed a "mini-debugger". As such, the overall debugger includes some generic aspects as well as some aspects specific to the source code by virtue of the inclusion of the identified code fragments.

The method may comprise extracting from source code one or more annotations identifying code fragments to be migrated to a debugger. The source code is then compiled to generate the object code. Binary code can then be generated from the object code, with the identified code fragments being integrated with a debugger in the binary code. In this way, the generation of binary code may be linking step which includes an element of re-writing to move identified fragments to another location. When the binary code is then used, a debugger is generated comprising aspects of the original source code, which can be pertinent to the functionality of the source code.

In some embodiments, the binary code comprises a first binary code file corresponding to the source code but excluding the identified code fragments and a second binary code file corresponding to the debugger. Alternatively, a single binary code file may incorporate both source code and debugger.

Further aspects of the disclosure relate to computer executable program products comprising computer executable instructions to carry out the methods of the aspects described above. Aspects of the disclosure may also relate to devices configured to carry out the methods of the aspects described above.

Some specific embodiments are now described by way of illustration with reference to the accompanying drawings in which like reference numerals refer to like features.

Through, binary rewriting techniques, the present disclosure can migrate whole chunks of functionality from the original software to a self-debugger. This offers several advantages. First, the input-output behaviour of the self-debugger is no longer pre-determined: every time the self-debugger intervenes, it executes different functionality that is not predetermined, but that can instead vary as much as functionality in protected programs can vary. This makes the protection much more resilient against automated analysis, deobfuscation, and deconstruction. Secondly, even if the attacker can figure out the control flow and the data flow equivalent of the original program, it becomes much harder for an attacker to undo the protection and to reconstruct that original program. In combination, these two strengths make it much harder for an attacker to detach the self-debugger while maintaining a functioning program to be traced or live-debugged.

Overall Self-Debugger Design

FIG. 1 illustrates the basic concepts of a self-debugging scheme according to the present disclosure. This embodiment targets Linux (and derivatives such as Android), the principles may also be applied to other environments such as Windows and OS X.

On the left of FIG. 1, an original, unprotected application is depicted, including a small control flow graph fragment. The shown assembly code is (pseudo) ARMv7 code. This unprotected application is converted into a protected application consisting of two parts: a debuggee that corresponds mostly to the original application as shown in the middle of the figure, and a debugger as shown on the right. Apart from some new components injected into the debuggee and the debugger, the main difference with the original application is that the control flow graph fragment has been migrated from the application into the debugger. This particular embodiment supports all single-entry, multiple-exit code fragments that contain no inter-procedural control flow such as function calls.

The migration of such fragments is more than simple copying: memory references such as the LDR instruction should be transformed because in the protected application, the migrated code executing in the debugger address space can preferably access data that still resides in the debuggee address space. All relevant components and transformations will be discussed in more detail in later sections.

The migrated fragments are preferably critical to the operation of the application. That is to say, the output produced by those operations carried migrated to the debugger process serves as input for the remaining part of the code process, and that that input is necessary to allow the code process to generate its correct output given that code process' other input. This requirement is easy to miss in practice. For example, a typical programmer might consider executing the initialization of variables of the code process in the debugger context. However, in general it does not suffice to execute the initialization of variables from the code process in the debugger process, because in practice, in processes it happens quite often that variable initialization (e.g., of local variables upon entry to a function) is performed as a result of good programming practices and to meet the source programming language definition requirements, without actually being required for the correct functioning of the process and for generating correct outputs. This may be because variables are simply not used in the executed paths in the code process, or because the initial values are overwritten before they can impact the code process' execution or output.

At run time, the operation of this protected application is as follows. First, the debuggee is launched at step s21, as if it was the original application. A newly injected initializer then forks off a new process for the debugger, in which the debugger's initializer immediately attaches to the debuggee process. Thus the debugger process is launched and attached to the dubuggee process at step s22.

When later during the program's execution the entry point of the migrated code fragment is reached, one possible flow of control in the application follows the arrows in FIG. 1. In the application/debuggee, the exception inducing instruction is executed and causes an exception at step s23 (labelled 1 in FIG. 1). The debugger is notified of this exception and handles it in its debugger loop at step s24 (labelled 2 in FIG. 1). Amongst others, the code in this loop is responsible for fetching the process state from the debuggee, looking up the corresponding, migrated code fragment, and transferring control to the entry point of that fragment at step s25 (labelled 3 in FIG. 1). As stated, in that fragment memory accesses cannot be performed as is. So they are replaced by invocations 4 of memory support functions 5 that access memory in the debuggee's address space at step s26. When an exit point 6 is eventually reached in the migrated code fragment, control is transferred to the corresponding point in the debugger loop 7 at step s27, which updates the state of the debuggee with the data computed in the debugger at step s28, and 8 control is transferred back to the debuggee at step s29. For code fragments with multiple exits, such as the example in the figure, the control can be transferred back to multiple continuation points in the debuggee. In this regard, the debugger of the present disclosure behaves in a more complex manner than existing self-debuggers, which implement a one-to-one mapping between forward and backward control flow transfers between debuggee and debugger.

Eventually, when the application exits, the embedded finalizers will perform the necessary detaching operations.

It is important to note that this scheme cannot only be deployed to protect executables (i.e., binaries with a main function and entry point), but also to protect shared libraries. Just like executables, libraries can contain initializers and finalizers that are executed when they are loaded or unloaded by the OS loader. At that time, all of the necessary forking, attaching and detaching can be performed as well.

Although the following description principally refers to protecting applications, implicitly the teaching applies equally applications and libraries. One aspect which is particularly relevant for libraries is the need for proper initialization and finalization of the debugger. This is necessary because it is not uncommon for libraries to be loaded and unloaded multiple times within a single execution of a program. For example, repetitive loading and unloading happens frequently for plug-ins of media players and browsers. Furthermore, whereas main programs consist of only one thread when they are launched themselves, they can consist of multiple threads when libraries are loaded and unloaded.

Tool Support

Figure 3:
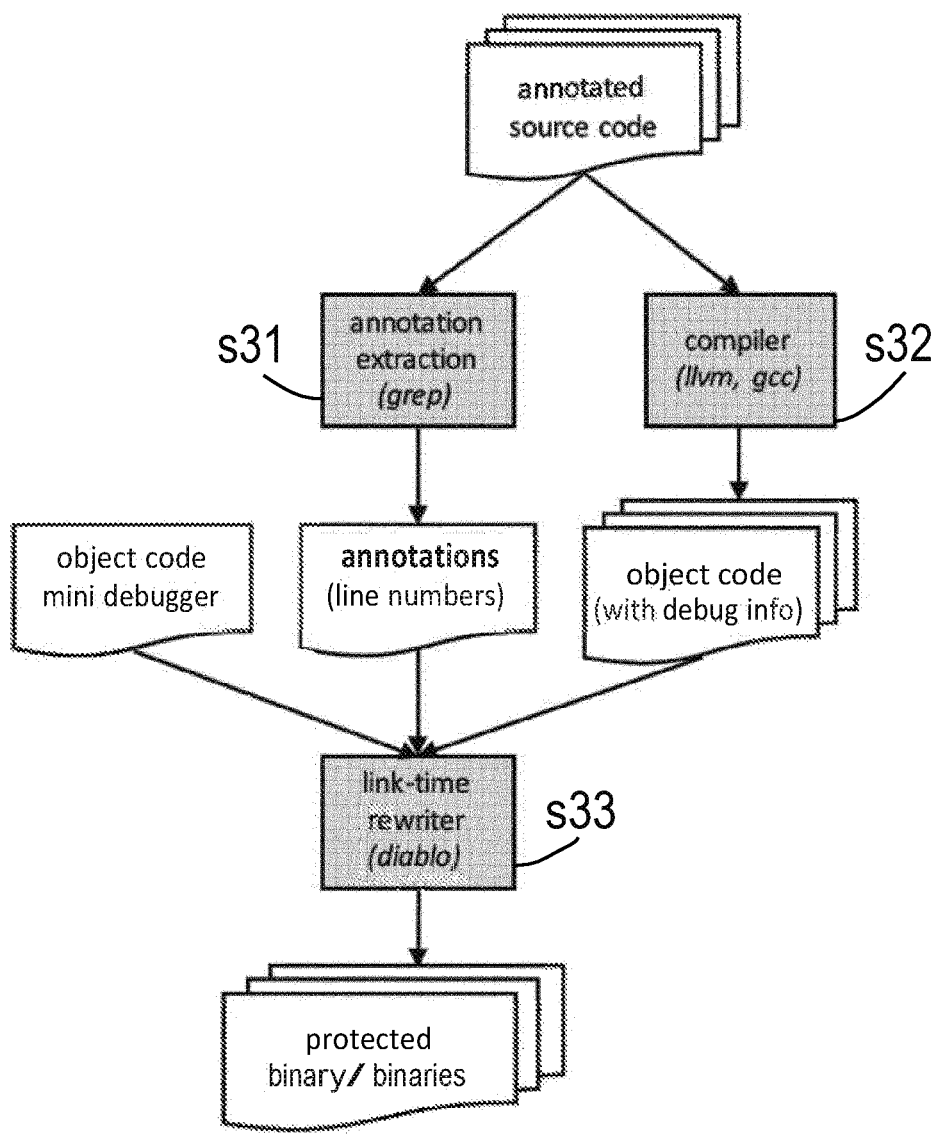
FIG. 3 shows primary aspects of the generation of binaries according to the present disclosure.

FIG. 3 depicts one possible conceptual tool flow.

Source Code Annotations

For determining the code fragments to be migrated to the debugger, a number of options exist. One, depicted in the figure—and also what we use in our implementation—is to annotate source code at step s31 with pragmas, comments or any other form of annotations that mark the beginnings and ends of the code regions to be migrated to the debugger process. A simple grep suffices to extract annotations and their line numbers and to store that information in an annotations file at step s32.

Alternative options would be to list the procedures or source code files to be protected, or to collect traces or profiles to select interesting fragments semi-automatically.

In that regard, it is important to note that the fragments to be migrated to the debugger should not necessarily be very hot fragments. To achieve a strong attachment between the debuggee and the debugger, it suffices to raise exceptions relatively frequently, but this does not need to be on the hottest code paths. Further considerations for the selection of fragments will be detailed below. Since every raised exception will introduce a meaningful amount of overhead (context switch, many ptrace calls, . . . ) it is important to minimize their number without compromising the level of protection.

Standard Compilers and Tools

For the disclosed self-debugging approach to be deployed, any "standard" compiler can be used at step s33. The technique does not impose any restrictions on the code generated by the compiler. In experimental evaluations, both GCC and LLVM have been used, in which there was no requirement to adapt or tune the code generation.

One requirement, however, is that the compiler and the binary utilities (the assembler and linker) provide the link-time rewriter with sufficiently accurate symbol and relocation information. This is required to enable reliable, conservative link-time code analyses and transformations to implement the whole self-debugging scheme, including the migration and transformation of the selected code fragments. Providing sufficiently accurate information is certainly within reach for commonly used tools. ARM's proprietary compilers, e.g., have done so for a long time by default, and for the GNU binutils, GCC, and LLVM, very simple patches suffice to prevent those tools from performing overly aggressive symbol relaxation and relocation simplification, and to force them to insert mapping symbols to mark data in code. These requirements have been documented before, and it has been shown that they suffice to perform reliable, conservative link-time rewriting of code as complex and unconventional as both CISC (x86) and RISC (ARMv7) versions of the Linux kernel and C libraries, which are full of manually written assembly code.

A large, generic part of the debugger—the "mini-debugger"—can be precompiled with the standard compiler and then simply linked into the application to be protected. Other parts, such as the debug loop's prologues and epilogues for each of the migrated fragments, are generated by the link-time rewriter, as they are customized for their specific fragments.

To allow the link-time rewriter to identify the fragments that were annotated in the source code, it suffices to pass it the line number information extracted from the source code files, and to let the compilers generate object files with debug information. That debug information then maps all addresses in the binary code to source line numbers, which the rewriter can link to the line numbers from the annotations.

Binaries, Libraries, and Processes

The link-time rewriter has two options to generate a protected application. A first option is to generate two binaries, one for the application/debuggee, and one for the debugger. From a security perspective, this might be preferable, because the application semantics and its implementation are then distributed over multiple binaries, which likely makes it even harder for an attacker to undo the protection, i.e., to patch the debuggee into the original application. This option does introduce additional run-time overhead, however, as the launching of the debugger then also requires loading the second binary.

The alternative option—used in the further examples below—is to embed all debuggee code and all debugger code into one binary. In that case, simple forking will suffice to launch the debugger. Whether or not, and to what extent, this eases attacks on the protection provided by self-debugging is an open research question.

Implementation

Initialization & Finalization

An extra initialization routine can be added to a protected binary. This routine is invoked as soon as the binary has been loaded (because it assigned a high priority), after which all the other routines listed in the .init section of the binary are executed.

This initialization routine invokes fork( ), thus creating two processes called the parent and the child. Once the initialization routine is finished the parent process will continue execution, typically by invoking the next initialization routine.

Two options exist for assigning the debugger and debuggee roles: After the fork, either the child process attaches to the parent process, or vice versa. In the former case, the child becomes the debugger and the parent becomes the debuggee, in the latter case the roles are obviously reversed.

The former option is preferred. The parent process (i.e. debuggee) remains the main application process, and it keeps the same process ID (PID). This facilitates the continuing execution or use of all external applications and inter-process communication channels that rely on the original PID, e.g., because they were set up before the loading and forking of a protected library.

This scheme does come with its own problems, however. As already mentioned, shared libraries can be loaded and unloaded (using dlopen( ) and dlclose( )) at any moment during the execution of a program. There is hence the potential problem that a protected shared library can be unloaded and loaded again while the originally loaded and forked off debugger hasn't finished its initialization yet. This can result in the simultaneous existence of two debugger processes, both attempting (and one failing) to attach to the debuggee. In order to avoid this situation, we block the execution of the thread that called dlopen( ). So until that time, that thread cannot invoke dlclose( ) using the handle it got with dlopen( ) and it cannot pass the handle to another thread either. An infinite loop in the debuggee's initialization routine prevents the loading thread from exiting the initialization routine before the debugger allows it to proceed.

The initialization routine also installs a finalizer in the debuggee. This finalizer does not do much. At program exit (or when the shared library is unloaded) it simply informs the mini-debugger of this fact by raising a SIGUSR1 signal, causing the mini-debugger to detach from all the debuggee's threads and to shut down the debugger process.

Multithreading Support Attaching the debugger is not trivial, in particular in the case of protected shared libraries. When a library is loaded, the application might consist of several threads. Only one of them will execute the debuggee initialization routine during its call to dlopen. This is good, as only one fork will be executed, but it also comes with the downside that only one thread will enter the infinite loop mentioned in the previous section. The other threads in the debuggee process will continue running, and might create new threads at any point during the execution of the debuggee initialization routine or of the debugger initialization routine. To ensure proper protection, the debugger should attach to every thread in the debuggee process as part of its initialization. To ensure that the debugger does not miss any threads created in the debuggee in the meantime, we use the/proc/[pid]/task directory, which contains an entry for every thread in a process. The debugger process attaches to all the threads by iterating over the entries in this directory, and by keeping iterating until no new entries are found. Upon attachment to the thread, which happens by means of a PTRACE_ATTACH request, the thread is also stopped (and the debugger is notified of this event by the OS), meaning that it can no longer spawn new threads from then on. So for any program that spawns a finite number of threads, the iterative procedure to attach to all threads is guaranteed to terminate. Once all threads have been attached to, the infinite loop in the debuggee is ended and its stopped threads are allowed to continue. When additional threads are created later during the program execution, the debugger is automatically attached to them by the OS, and it gets a signal such that all the necessary bookkeeping can be performed.

Control Flow

Transforming the control flow in and out of the migrated code fragments consists of several parts. We discuss the raising of exceptions to notify the debugger, the transferring of the ID informing the debugger of what fragment is to be executed, and the customized pro- and epilogues that are added to every code fragment.

Raising Exceptions

The actual notification of the debugger can happen through any instruction that causes an exception to be raised. In our implementation, we use a software breakpoint (i.e., a BKPT instruction on ARMv7) for simplicity. Other, less conspicuous exceptions can of course be used, such as those caused by illegal or undefined instructions. When such instructions are reachable via direct control flow (direct branch or fall-through path), they can of course easily be detected statically. But when indirect control flow transfers are used to jump to data in the code sections, and the data bits correspond to an illegal or undefined instruction, static detection can be made much harder. Likewise, legal instructions that throw exceptions only when their operands are "invalid" can be used to conceal the goal of the instructions. Such instructions include division by zero, invalid memory accesses (i.e., a segmentation fault), or the dereferencing of an invalid pointer (resulting in a bus error).

Transferring IDs

We call the thread in the debuggee that raises an exception the requesting thread, as it is essentially asking the debugger to execute some code fragment.

The debugger, after being notified about the request by the OS, needs to figure out which fragment to execute. To enable this, the debuggee can pass an ID of the fragment in a number of ways. One option is to simply use the address of the exception inducing instruction as an ID. Another option is to pass the ID by placing it in a fixed register right before raising the exception, or in a fixed memory location. In our implementation, we used the latter option. As multiple threads in the debuggee can request a different fragment concurrently, the memory location cannot be a global location. Instead, it needs to be thread-local. As each thread has its own stack, we opted to pass the fragment's ID via the top of the stack of the requesting thread.

Depending on the type of instruction used to raise the exception, other methods can be envisioned as well. For example, the divisor operand of a division (by zero) instruction could be used to pass the ID as well.

Prologues and Epilogues

The debugger loop in the mini-debugger is responsible for fetching the program state of the debuggee before a fragment is executed, and for transferring it back after its execution. Standard ptrace functionality is used to do this.

For every migrated code fragment, the debug loop also contains a custom prologue and epilogue to be executed before and after the code fragment resp. The prologue loads the necessary values from the struct into registers, the epilogue writes the necessary values back into the struct. The prologue is customized in the sense that it only loads the registers that are actually used in the fragment (the so-called live-in registers). The epilogue only stores the values that are live-out (i.e., that will be consumed in the debuggee) and that were overwritten in the code fragment.

Memory Accesses

For every load or store operation in a migrated code fragment, an access to the debuggee's memory is needed. There exist multiple options to implement such accesses. The first is to simply use ptrace functionality: the debugger can perform PTRACE_PEEKDATA and PTRACE_POKE-DATA requests to read and write in the debuggee's address space. In this case, per word' to be read or written, a ptrace system call is needed, which results in a significant overhead. Some recent Linux versions support wider accesses, but those are not yet available everywhere, such as on Android.

The second option is to open the/proc/[pid]/mem file of the debuggee in the debugger, and then simply read or write in this file. This is easier to implement, and wider data can be read or written with a single system call, so often this method is faster. Writing to another process's/proc/[pid]/mem is not supported on every version of the Linux/Android kernels, however, so in our prototype write requests are still implemented with the first option.

A third option builds on the second one: if the binary-rewriter can determine which memory pages will be accesses in a migrated code fragment, the debug loop can actually copy those pages into the debugger address space using option 2. The fragment in the debugger then simply executes regular load and store operations to access the copied pages, and after the fragment has executed, the updated pages are copied back to the debuggee. This option can be faster if, e.g., the code fragment contains a loop to access a buffer on the stack. Experiments we conducted to compare the third option with the previous two options revealed that this technique might be worthwhile for as few as 8 memory accesses. We did not implement reliable support for it in our prototype, however: A conservative link-time analysis for determining which pages will be accessed by a code fragment remains future work at this point.

A fourth potential option is to adapt the debuggee, e.g., by providing a custom heap memory management library (malloc, free, . . . ) such that all allocated memory (or at least the heap) is allocated as shared memory between the debuggee and the debugger processes. Then the code fragments in the debugger can access the data directly. Of course, the fragments still need to be rewritten to include a translation of addresses between the two address spaces, but likely the overhead of this option can be much lower than the overhead of the other options. Implementing this option and evaluating it remains future work at this point.

Security-wise, the different options will likely also have an different impact, in the sense that they will impact the difficulty for an attacker to reverse-engineer the original semantics of the program and to deconstruct the self-debugging version into an equivalent of the original program.

Combining Self-Debugging with Other Protections

To provide strong software protection against MATE attacks, additional protection techniques may be employed. For example, on top of self-debugging, obfuscation to prevent static analysis may be employed, together with anti-tampering techniques to prevent all kinds of attacks.

For example, the binary rewriter that implements the self-debugging approach may also applies a number of other protections, such as one or more of:
  Control flow obfuscations: the well-known obfuscations of opaque predicates, control flow flattening, and branch functions;
  Code layout randomization: during code layout, code from all functions is mingled and the layout is randomized;
  Code mobility: a technique in which code fragments are removed from the static binary and only down-loaded, as so-called mobile code, into the application at run time;
  Code guards: online and offline implementations of techniques in which hashes are computed over the code in the process address space to check that the code has not been altered.
  Control flow integrity: a lightweight technique in which return addresses are checked to prevent that internal functions are invoked from external code.
  Instruction set virtualization: a technique with which native code is translated to bytecode that is inter-preted by an embedded virtual machine instead of executed natively.

Combining the self-debugging technique with all of those protections poses no problem in practice. In the link-time rewriter, it is not difficult to determine a good order to perform all the transformations for all of the protections, and to prevent that multiple techniques are applied on the same code fragments when those techniques do not actually compose. For example, mobile code is relocated to randomized locations. Handling all protections correctly requires some bookkeeping, but nothing complex.

As for the run-time behaviour, the techniques compose as well. Multiple techniques require initializers and finalizers, but in the debugger process we do not want to execute the initializers of the other protections, as that debugger process should only be a debugger, and not another client for code mobility or any other technique. To prevent the other initializers from executing, the self-debugger initializers are given the highest priority. They are executed first when a binary or library is loaded, and the debugger initialization routine implements in fact both the real initializer, as well as the debug loop. The routine therefore never ends (that is, as long as the finalizer is not invoked), and hence control is never transferred to the other initializers that might be present in the binary.

Evaluation

Evaluation Platform

One implementation of the self-debugger targets ARMv7 platforms. Concretely, this implementation targeted and extensively evaluated the implementation on Linux 3.15 and (unrooted) Android 4.3+4.4. It has further been confirmed that the techniques still work on the latest versions of Linux (4.7) and Android (7.0), and that is indeed the case.

The testing hardware consisted of several developer boards. For Linux, a Panda Board was used featuring a single-core Texas Instruments OMAP4 processor, an Arndale Board featuring a double-core Samsung Exynos processor, and a Boundary Devices Nitrogen6X/SABRE Lite Board featuring a single-core Freescale i.MX6q processor. The latter board was also used for the Android versions.

In the tool chain, GCC 4.8, LLVM 3.4, and GNU binutils 2.23 were used. Code was compiled with the following flags: -Os-march=armv7-a-marm-mfloat-abi=softfp-mfpu-mfpu =neon-msoft-float.

Use Cases

The self-debugging scheme has been shown to function in multiple use cases. For example, in a digital rights management scenario, the following practical considerations were encountered.

This use case consisted of two plugins, written in C and C++, for the Android media framework and the Android DRM framework. These libraries are necessary to obtain access to encrypted movies and to decrypt them. A video app programmed in Java is used as a GUI to access the videos. This app communicates with the mediaserver and DRM frameworks of Android, informing the frameworks of the vendor of which it needs plug-ins. On demand, these frameworks then load the plug-ins. Concretely, these servers are the mediaserver and drmserver processes running on Android.

During experiments and development, several features were observed that make this use case a perfect stress test for this technique. First, the mediaserver is multi-threaded, and creates and kills new threads all the time. Secondly, the plug-in libraries are loaded and unloaded frequently. Sometimes the unloading is initiated even before the initialization of the library is finished. Thirdly, as soon as the process crashes, a new instance is launched. Sometimes this allows the Java video player to continue functioning undisrupted, sometimes it doesn't. This makes debugging the implementation of our technique even more complex than it already is for simple applications. Fourthly, the mediaserver and drmserver are involved in frequent inter-process communications. Nevertheless, successful implementation was achieved based on the principles described above.

The techniques may be applied in many other use case scenarios. For example, in mobile banking on any other scenario in which security is desirable.

Figure 4:
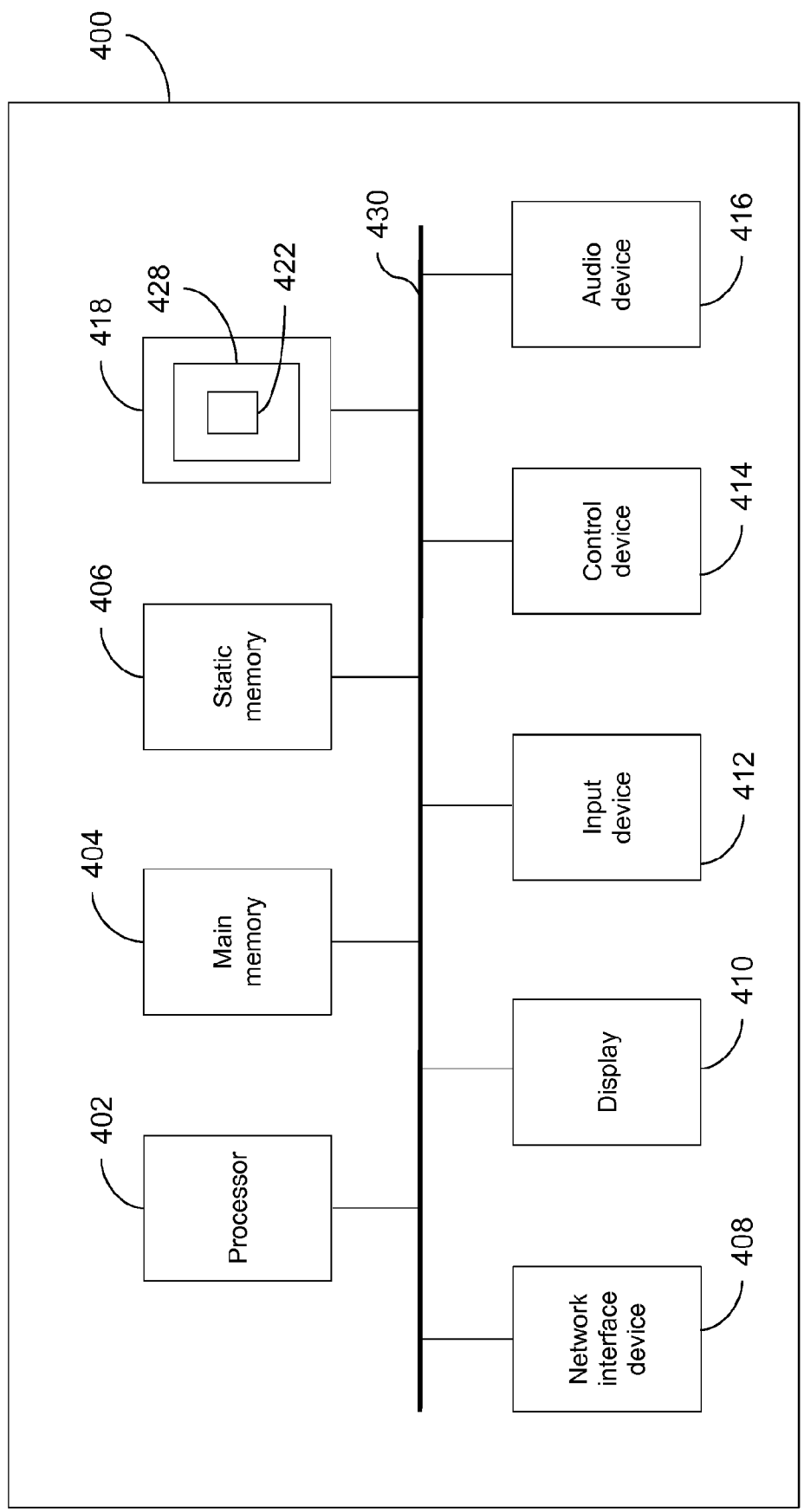
FIG. 4 shows a hardware infrastructure for implementing a preferred embodiment.

FIG. 4 illustrates a block diagram of one implementation of a computing device 400 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory (e.g., a data storage device 418), which communicate with each other via a bus 430.

Processing device 402 represents one or more general-purpose processors such as a microprocessor, central processing unit, or the like. More particularly, the processing device 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic (instructions 422) for performing the operations and steps discussed herein.

The computing device 400 may further include a network interface device 408. The computing device 400 also may include a video display unit 410 (e.g., a liquid crystal display (LCD) or a cathode ray tube (CRT)), an alphanumeric input device 412 (e.g., a keyboard or touchscreen), a cursor control device 414 (e.g., a mouse or touchscreen), and an audio device 416 (e.g., a speaker).

The data storage device 418 may include one or more machine-readable storage media (or more specifically one or more non-transitory computer-readable storage media) 428 on which is stored one or more sets of instructions 422 embodying any one or more of the methodologies or functions described herein. The instructions 422 may also reside, completely or at least partially, within the main memory 404 and/or within the processing device 402 during execution thereof by the computer system 400, the main memory 404 and the processing device 402 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example control unit 410 in relation to FIG. 4) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining," "identifying," "replacing," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for securing software, comprising:
    launching a software process;
    attaching a debugger process to the software process;
    executing the software process such that the debugger process is invoked at least once; and
    performing one or more functions within the debugger process in response to invocation of the debugger process, the one or more functions having an output dependent on data associated with the software process;
    wherein the output of the one or more functions within the debugger process serves as data input for remaining part of the software process.

2. A method according to claim 1, wherein the output comprises a data output for use by the software process.

3. A method according to claim 1, wherein the output of a given function may indicate multiple points of return within the software process for continued execution.

4. A method according to claim 1, wherein the debugger process provides memory support capabilities to enable the one or more functions to retrieve data from memory within address space of the software process.

5. A method according to claim 1, wherein the debugger process is invoked when a break point within the software process is reached.

6. A method according to claim 1, wherein the software process implements an executable, such as an application.

7. A method according to claim 1, wherein the software process implements a library.

8. A computer comprising:
    a memory having executable instructions executed by a processor to:
    launch a software process;
    attach a debugger process to the software process;
    execute the software process such that the debugger process is invoked at least once; and
    perform one or more functions within the debugger process in response to invocation of the debugger process, the one or more functions having an output dependent on data associated with the software process;
    wherein the output of the one or more functions within the debugger process serves as data input for remaining part of the software process.

9. A non-transitory computer readable medium having executable instructions when executed by a processor cause a computer to:
    launch a software process;
    attach a debugger process to the software process;
    execute the software process such that the debugger process is invoked at least once; and
    perform one or more functions within the debugger process in response to invocation of the debugger process, the one or more functions having an output dependent on data associated with the software process;
    wherein the output of the one or more functions within the debugger process serves as data input for remaining part of the software process.

* * * * *